(12) United States Patent
Dhome et al.

(10) Patent No.: US 10,442,465 B2
(45) Date of Patent: Oct. 15, 2019

(54) PARKING ASSISTANCE DEVICE AND VEHICLE PROVIDED WITH SUCH A DEVICE

(71) Applicant: COMMISSARIAT A L'ENERGIE ATOMIQUE ET AUX ENERGIES ALTERNATIVES, Paris (FR)

(72) Inventors: Yoann Dhome, Champigny-sur-Marne (FR); Brice Burger, Corbeil-Essonnes (FR); Patrick Sayd, Villebon sur Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 176 days.

(21) Appl. No.: 15/311,789

(22) PCT Filed: Apr. 3, 2015

(86) PCT No.: PCT/EP2015/097002
§ 371 (c)(1),
(2) Date: Nov. 16, 2016

(87) PCT Pub. No.: WO2015/185764
PCT Pub. Date: Dec. 10, 2015

(65) Prior Publication Data
US 2017/0158239 A1 Jun. 8, 2017

(30) Foreign Application Priority Data
Jun. 4, 2014 (FR) .................................... 14 55049

(51) Int. Cl.
*B62D 15/02* (2006.01)
*B62D 13/06* (2006.01)
(Continued)

(52) U.S. Cl.
CPC ........ *B62D 15/0285* (2013.01); *B60T 8/1708* (2013.01); *B62D 13/06* (2013.01);
(Continued)

(58) Field of Classification Search
CPC ... B60T 8/1708; B60T 2201/10; B62D 13/06; B62D 15/0285; G01C 22/025;
(Continued)

(56) References Cited

U.S. PATENT DOCUMENTS 7,920,070 B2 * 4/2011 Chen ................. B62D 15/0285
340/435
8,072,663 B2 * 12/2011 O'Neill ............... G02B 26/105
359/199.3
(Continued)

FOREIGN PATENT DOCUMENTS

DE  10 2004 057797 A1  6/2006
EP       2 581 272 A1  4/2013
(Continued)

*Primary Examiner* — Jerrah Edwards
(74) *Attorney, Agent, or Firm* — Baker & Hostetler LLP

(57) ABSTRACT

A device capable of equipping a vehicle comprises: a first sensor placed on the side of the vehicle facing the entrance of the space, the sensor, which may be a lidar, makes distance and orientation measurements of said vehicle with respect to the space based on the reconstruction of a cloud of points belonging to the surface of said walls; a series of sensors placed on the lateral sides of the vehicle to measure the distance from the sides to the lateral walls of the parking space, these sensors possibly being ultrasound or optical; processing means calculating the position and the relative orientation of the vehicle with respect to the walls as a function of the measurements by the various sensors and as a function of the various parking phases.

17 Claims, 14 Drawing Sheets

(51) Int. Cl.
    *G01C 22/02*     (2006.01)
    *G01S 13/93*     (2006.01)
    *G05D 1/02*     (2006.01)
    *B60T 8/17*     (2006.01)

(52) U.S. Cl.
    CPC .......... *G01C 22/025* (2013.01); *G01S 13/931* (2013.01); *G05D 1/024* (2013.01); *G05D 1/0246* (2013.01); *G05D 1/0257* (2013.01); *G05D 1/0276* (2013.01); *B60T 2201/10* (2013.01); *G01S 2013/9314* (2013.01)

(58) Field of Classification Search
    CPC .......... G01S 13/931; G01S 2013/9314; G05D 1/024; G05D 1/0246; G05D 1/0257; G05D 1/0276
    See application file for complete search history.

(56) References Cited

U.S. PATENT DOCUMENTS

| | | | |
|---|---|---|---|
| 9,227,568 B1* | 1/2016 | Hubbell | ................ B60R 1/081 |
| 2007/0027581 A1 | 2/2007 | Bauer et al. | |
| 2009/0167564 A1* | 7/2009 | Long-Tai | ........... B62D 15/0285 |
| | | | 340/932.2 |
| 2010/0053715 A1* | 3/2010 | O'Neill | ................ G01S 7/4817 |
| | | | 359/199.3 |

FOREIGN PATENT DOCUMENTS

| | | | |
|---|---|---|---|
| EP | 2 647 549 A2 | 10/2013 | |
| WO | WO 01/02215 A1 * | 11/2001 | ............... B60R 1/00 |

* cited by examiner

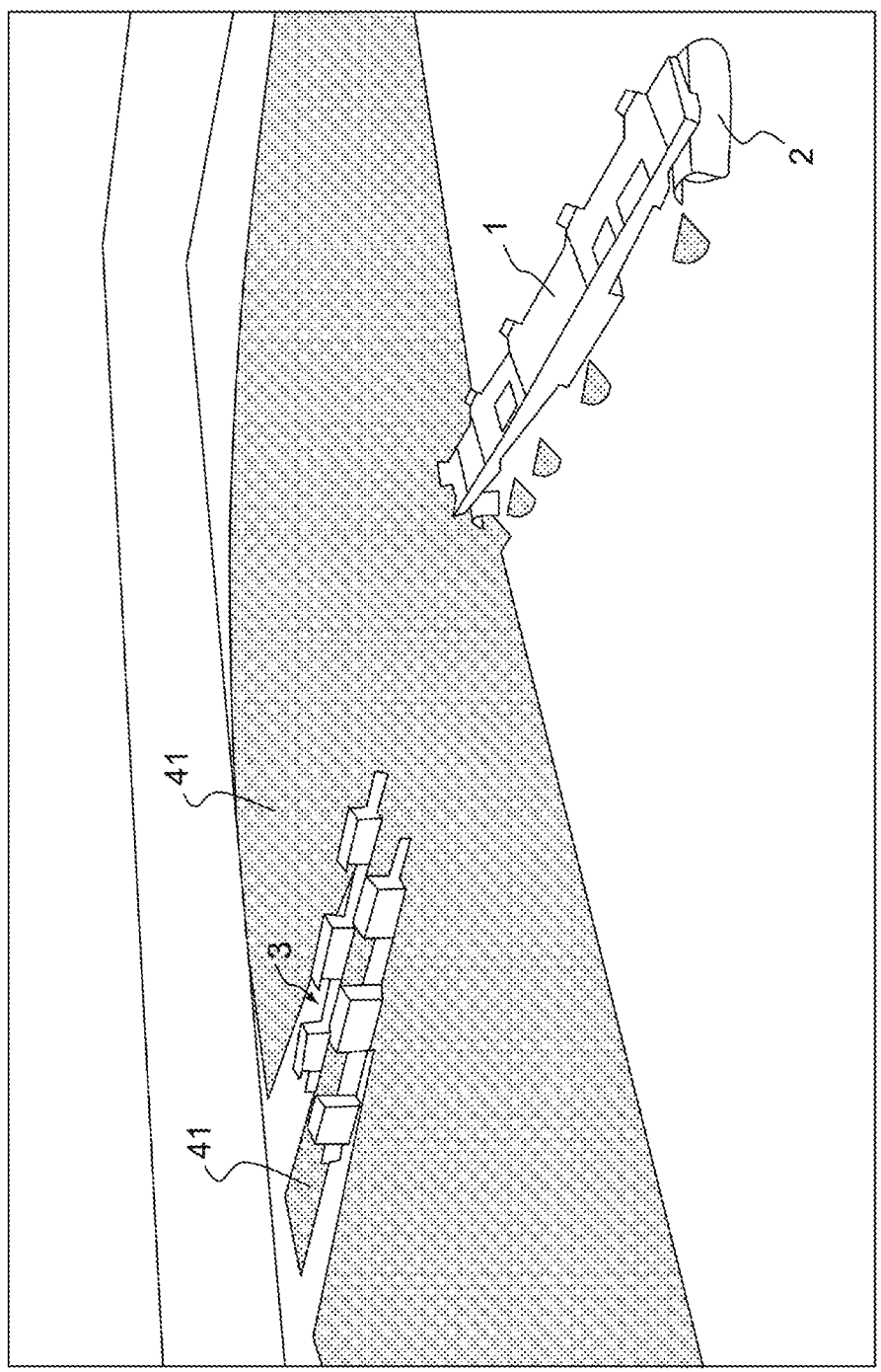

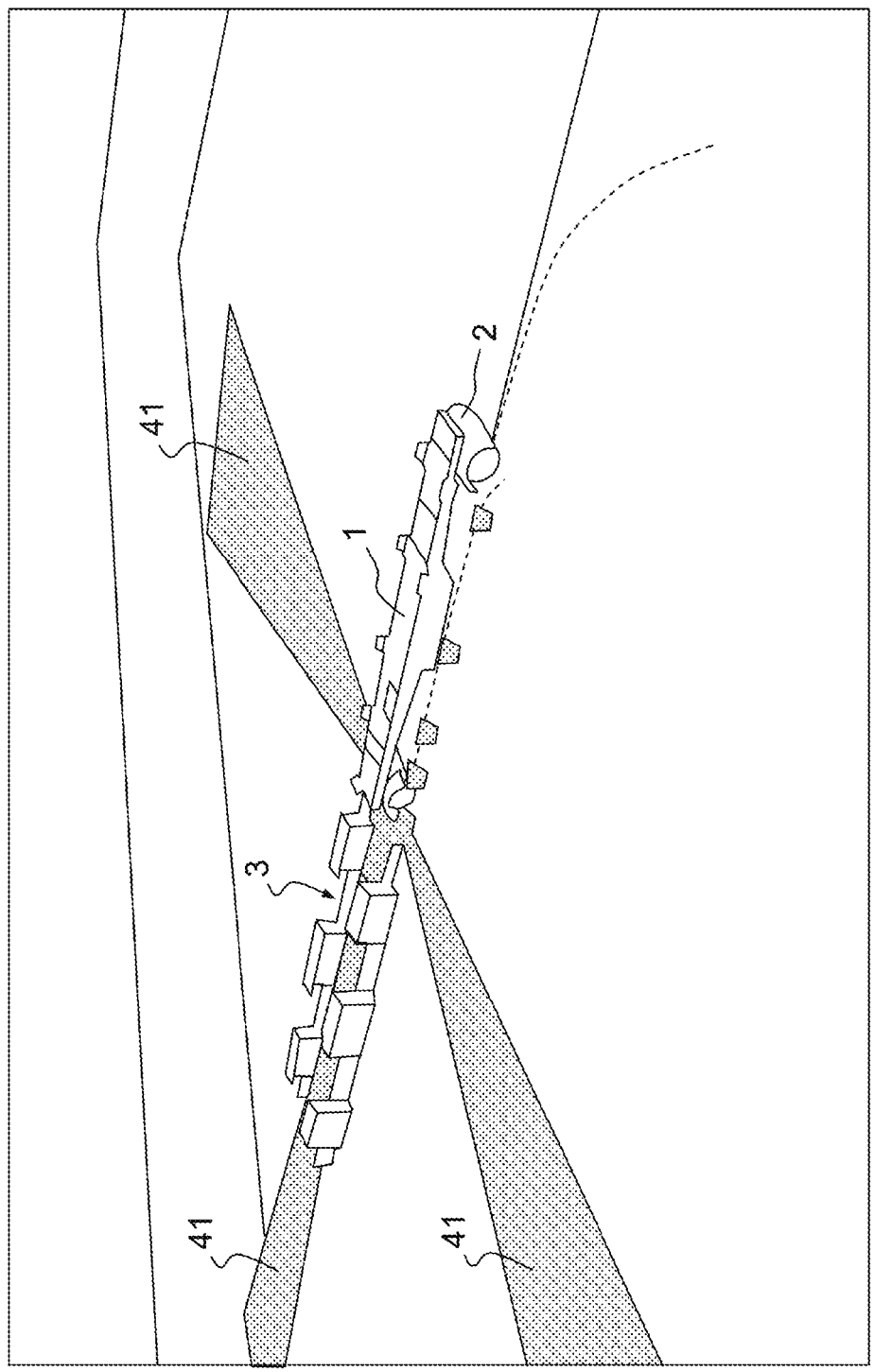

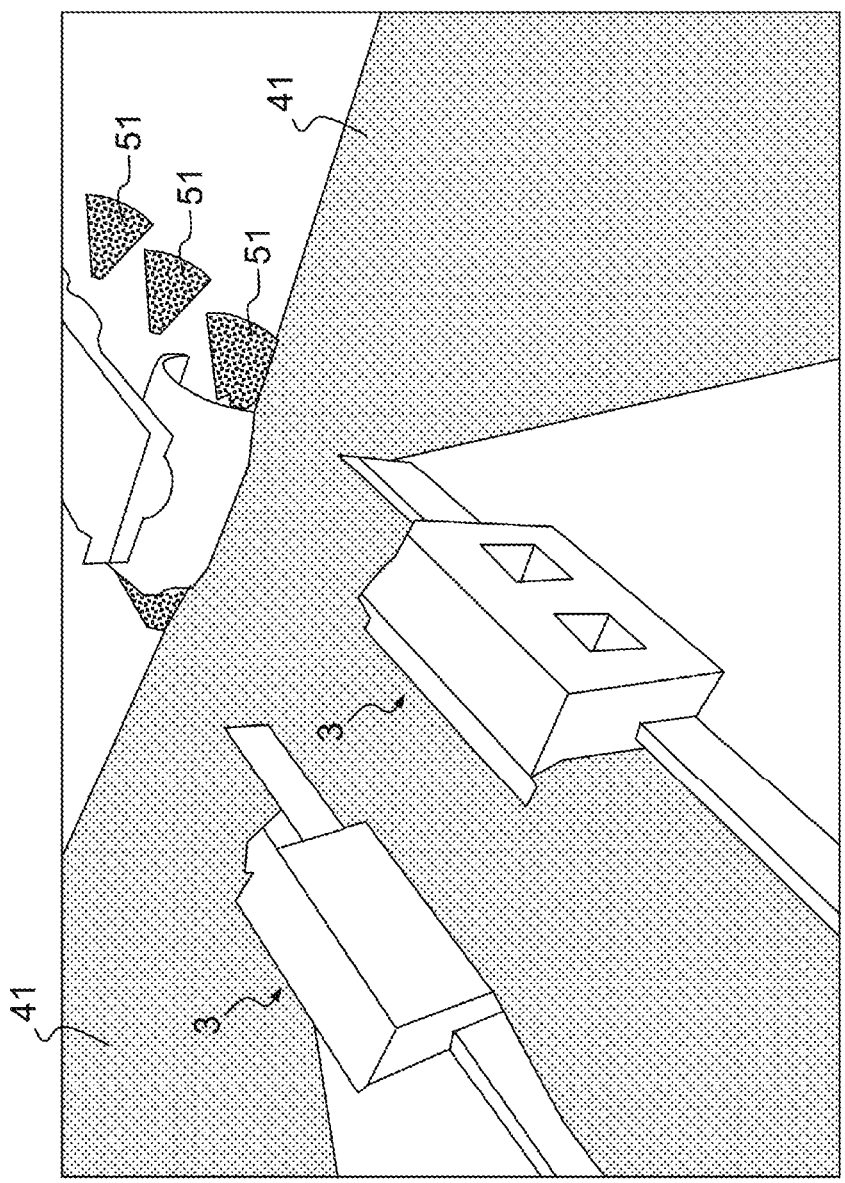

PARKING ASSISTANCE DEVICE AND VEHICLE PROVIDED WITH SUCH A DEVICE

CROSS-REFERENCE TO RELATED APPLICATIONS

This application is a National Stage of International patent application PCT/EP2015/097002, filed on Apr. 3, 2015, which claims priority to foreign French patent application No. FR 1455049, filed on Jun. 4, 2014, the disclosures of which are incorporated by reference in their entirety.

FIELD OF THE INVENTION

The present invention relates to a device for assisting with the parking of a vehicle. It is particularly applicable to assistance with the parking of long or oversized vehicles. It also relates to a vehicle equipped with such a device.

BACKGROUND

Parking assistance may be seen as a commodity in certain cases, in particular for passenger vehicles or other light vehicles. But for a growing number of applications, parking assistance has become an essential function. This is particularly the case for the high-precision parking of long vehicles.

There is such a need in particular in intra-port traffic. This traffic comprises moving containers between cargo loading/unloading points and temporary storage areas (connected to the road and rail transport infrastructures). The loading/unloading phases are carried out with the aid of mobile lifting means (cranes) which load/unload the mobile platforms used for transportation between the various points of the port. The precision of positioning of the mobile platform when parking is crucial to accelerating the loading/unloading task and making it safe.

Specifically, the operations of parking a platform or trailer, propelled by means of a motorized cab, are tricky and time consuming, even when they are carried out by experienced drivers. Furthermore, accidents may occur, jeopardizing not only the goods within the containers but also nearby personnel involved in the maneuvers. In order to increase the productivity and safety of port traffic, parking operations must therefore be accelerated while substantially decreasing the number of accidents. In order to decrease these accidents, the containers must be loaded and unloaded with precision, which demands that the platforms be precisely positioned in the parking spaces.

In order to improve precision and make the operations of loading and unloading containers onto/from platforms safe, there exist parking bays equipped with lateral walls. The problem is then to quickly park a platform, trailer or long vehicle in a parking space with a margin of a few centimeters. A parking assistant or automatic parking is necessary for this purpose.

An exemplary application is to manage to get a vehicle that is 13 meters long and 3 meters wide, bearing a payload of the order of 60 tonnes, to automatically insert itself into a parking space with a precision of positioning of the order of centimeters, from a starting position that is about fifteen or more meters away from the parking space, parking area.

Existing solutions use magnetic terminals or the technology referred to as wire guidance. These solutions have multiple drawbacks:

first of all, they require the installation, on the vehicle, of antennas very close to the ground. However, installing elements close to the ground on a vehicle limits its ground clearance and presents a risk to the antennas through impacts with objects located on the ground;

in any case, the antennas must be very precisely positioned horizontally and vertically, as well as in terms of planarity. This is both technically difficult and difficult to guarantee for the long term due to vibrations and impacts, which are inevitable in operational phases;

moreover, devices that are sometimes active, such as transponders or powered metal wires, must be installed in the ground, this requiring substantial work.

These solutions are therefore costly and not very reliable.

SUMMARY OF THE INVENTION

One particular aim of the invention is to overcome the aforementioned drawbacks and to allow quick and precise parking, in total safety, in particular for long or oversized vehicles. To this end, one subject of the invention is a device for assisting with the parking of a vehicle within a parking space provided with at least one lateral wall having longitudinally distributed geometric features, said device being capable of equipping a vehicle and comprising at least:

a first sensor placed on the side of said vehicle facing the entrance of said space, the measuring beam of said sensor scanning said space, said sensor making measurements of the distance and orientation of said vehicle with respect to said space based on the reconstruction of a cloud of points belonging to the surface of said walls or echo points re-emitted by said walls;

a series of sensors placed on the lateral sides of said vehicle that are intended to measure the distance from said sides to said lateral walls, the measuring beams of said sensors scanning said inner walls;

processing means calculating the position and the relative orientation of said vehicle with respect to said walls in at least three separate phases:

a phase of approaching said space in which, said walls being scanned by the measuring beam of said first sensor, the relative position and orientation are calculated with respect to the position and orientation of a general form of said walls deduced from said cloud;

a phase of entering said space in which the position and the relative orientation are at least calculated with respect to the position and orientation of simple geometric forms deduced from said cloud, as a function of said geometric features;

a phase of advancing into said space in which the processing means calculate a relative position and orientation by comparing said cloud with a memorized model of said walls and calculate another position and another relative orientation based on the distance measurements made by the sensors of said series;

said processing means comprising a data fusion module that carries out spatio-temporal filtering of the relative position and orientation calculations produced from the various sensors, the calculations thus filtered giving information on the position and orientation of said vehicle in order to control its movement.

The first sensor is, for example, at least one lidar sensor, or at least one radar sensor or at least one video sensor.

The sensors of said series are, for example, ultrasound sensors or optical telemetry sensors.

The spatio-temporal filtering is, for example, carried out using a Kalman filter or a Monte Carlo method.

The processing means calculate, for example, a relative position and orientation from the distance measurements made by the sensors of said series during the entry phase.

The processing means calculate, for example, a relative position and orientation by comparing said cloud with a memorized model is carried out by applying an algorithm for estimating the transformation between clouds of points.

The measurements obtained by said first sensor are, for example, sampled in a first period T1 and the measurements obtained from the sensors of said series are sampled in a second period T2, the position and orientation calculations being carried out within one period.

In one possible embodiment, the sensors of said series are, for example, positioned with increasing spacing between two consecutive sensors, starting from the side bearing said first sensor.

The processing means carry out, for example, consistency checks in time and space between the successive calculations of relative position and orientation obtained from measurements by said first sensor, and between the successive calculations of relative position and orientation obtained from measurements by the sensors of said series, the consistent calculations being delivered to said data fusion module. In the event of an inconsistency between two successive positions and orientations being detected, a warning signal is, for example, emitted.

In one possible embodiment, the device additionally comprises at least one odometer, placed on a wheel of the vehicle, the processing means carrying out the estimation of the movement speed vector of said vehicle based on wheel speed measurements produced by the odometer, said estimation producing an estimate of the position and orientation of said vehicle that is taken into account by the data fusion module so as to define the position and relative orientation of said vehicle in order to control its movement.

The invention also relates to a vehicle comprising a monitoring and control system for assisting with driving, equipped with a device such as described above, said system providing information on the positions and orientation of said vehicle to said monitoring and control system. The vehicle is, for example, automatically driven. It is, for example, composed of a cab and a trailer, said sensors being placed on said trailer. Said vehicle may be intended to be loaded and unloaded with/of containers in said parking space, e.g. in a port area.

BRIEF DESCRIPTION OF THE DRAWINGS

Other features and advantages of the invention will become apparent with the aid of the description which follows, made in relation to the appended drawings which show:

FIGS. 4a to 4e, an illustration of various parking phases carried out with the aid of a device according to the invention;

FIGS. 5a, 5b and 5c, an illustration of the approach, entry and reversing phases;

DETAILED DESCRIPTION

Figure 1A:
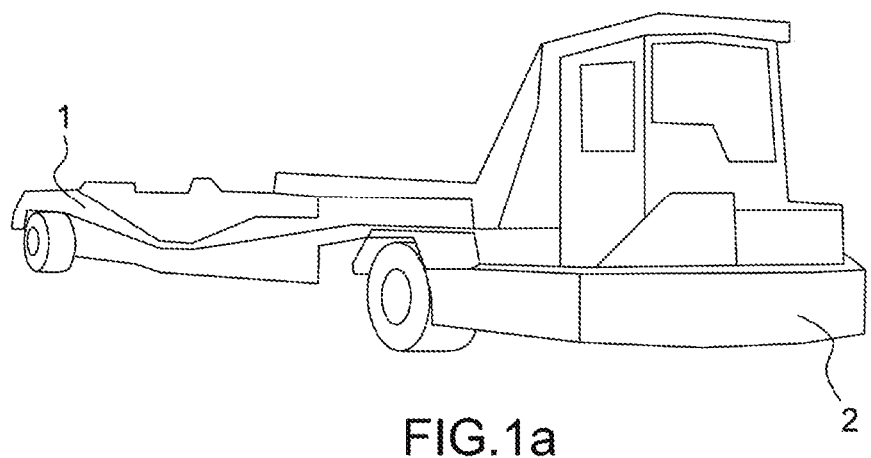
FIGS. 1a and 1b, an exemplary application of parking assistance.
Figure 1B:
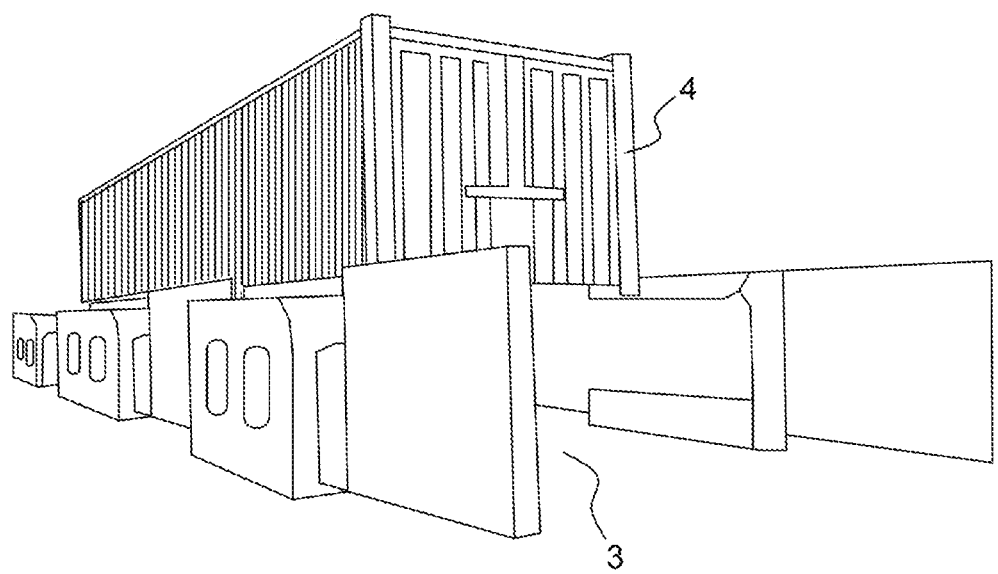

FIGS. 1a and 1b show an exemplary parking assistant to which the invention is advantageously applicable. FIG. 1a shows a mobile platform 1 towed or pushed by a motorized cab 2. In the example of FIG. 1a, the trailer 1 measures, for example, 13 meters long and 3 meters wide. It is used in port traffic for being loaded with a container whose weight reaches many tens of tonnes.

FIG. 1b shows a parking bay 3 intended to receive the trailer 1. The parking bay will be described in more detail below. In the example of FIG. 1, it bears a container 4 that is ready to be loaded onto the trailer 3 when the latter is parked in the bay 3. The invention is presented with a particular exemplary parking space 3. It is of course applicable to other types of parking space. More generally, it is also applicable to precise parking assistance, in particular of long vehicles, outside port traffic.

Figure 2A:
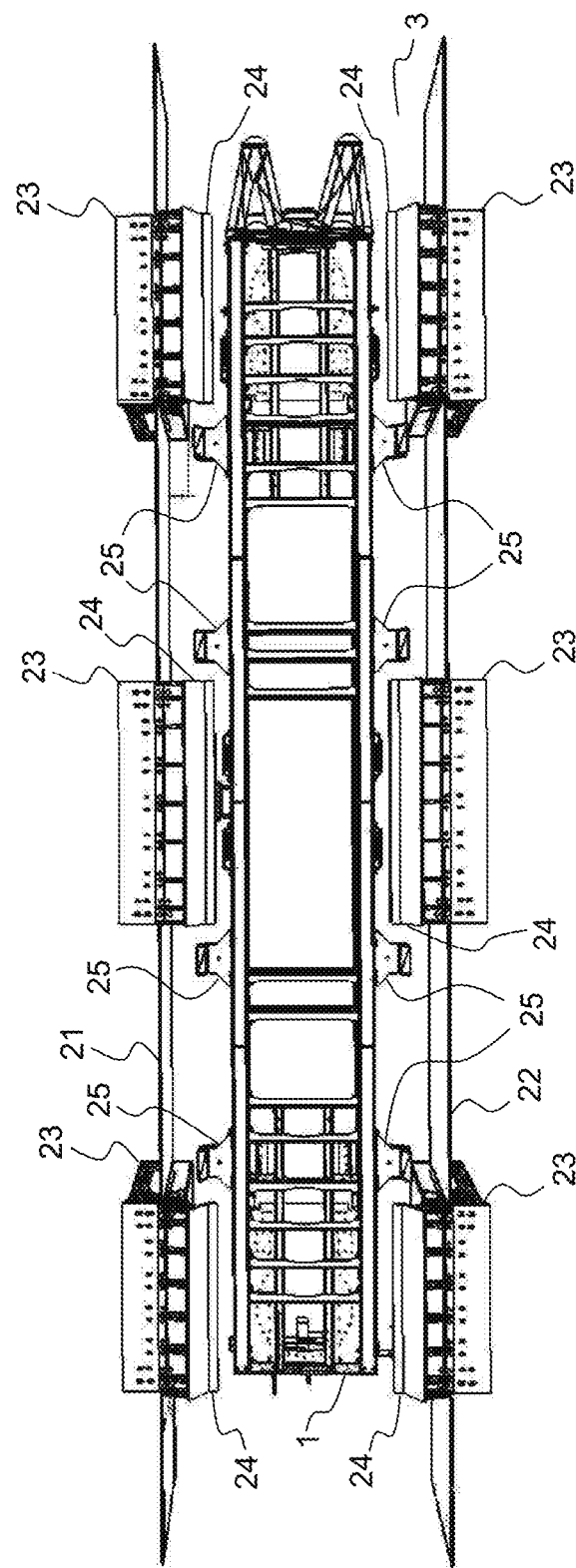
FIGS. 2a and 2b, an exemplary vehicle and parking space used in the preceding example.
Figure 2B:
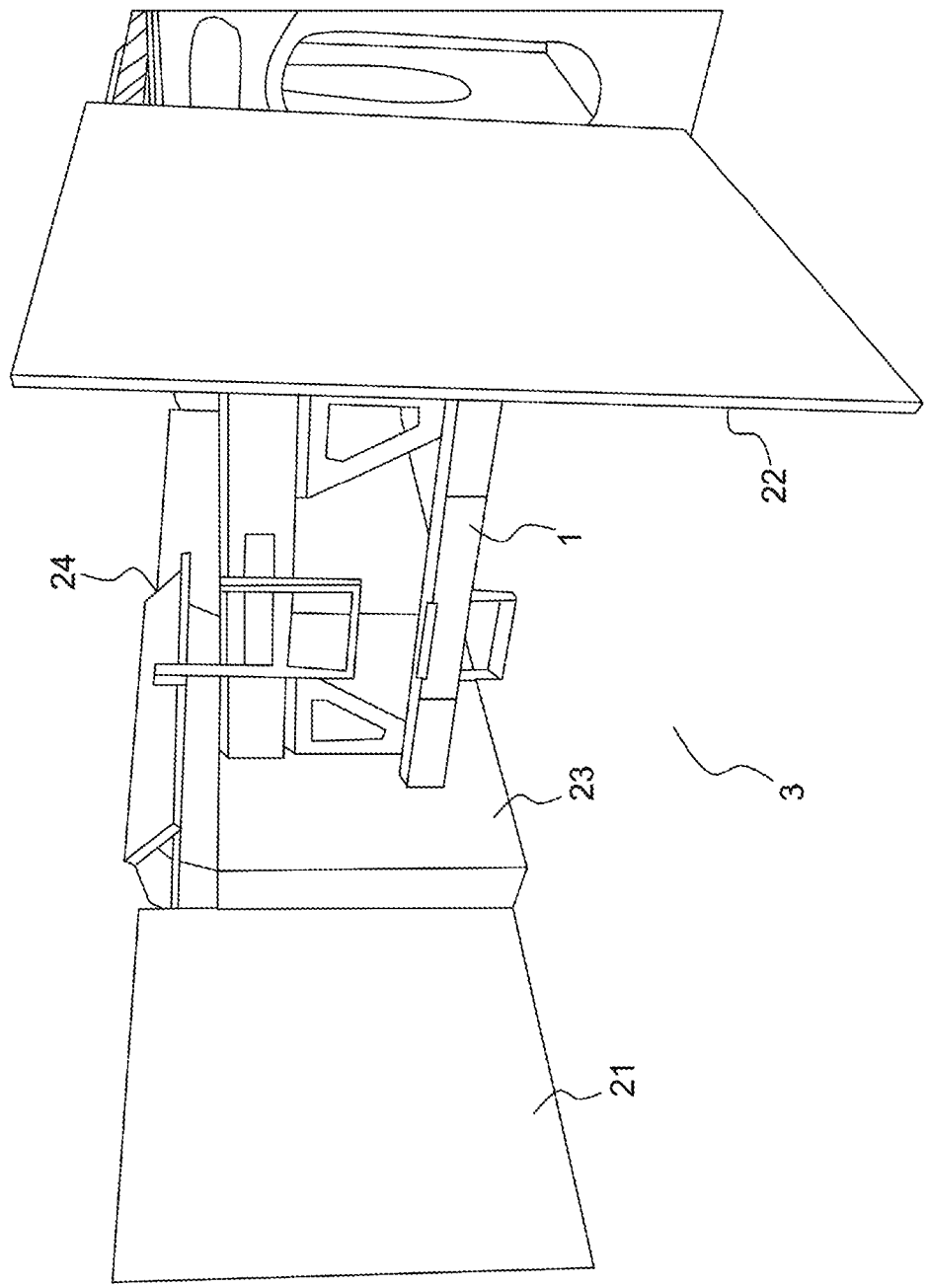

FIGS. 2a and 2b detail the particular exemplary application of the invention depicted in FIGS. 1a and 1b. FIG. 2b presents, via a top view, the trailer 1 parked in the parking bay 3, which bay will hereinafter be referred to as the loading bay, meaning that the trailer is loaded or unloaded with/of its container in this bay.

FIG. 2b shows, via a partial perspective view, the trailer 1 entering the bay 3. This bay comprises two lateral walls 21, 22 taking form of crenelations. The crenelations correspond to posts 23 surmounted by supports 24, protruding toward the inside of the walls. These supports 24 are intended to bear a container together, the supports together forming a receiving surface. In the example of FIG. 2a, three posts 23 are positioned on each side.

The trailer 1 comprises a series of supports 25, protruding outward, positioned laterally on each side. When parked, as illustrated by FIG. 2a, the supports 25 of the trailer are positioned between the posts. The trailer is then ready to be loaded.

Loading a container 4 onto the trailer 1 occurs in the following manner:

the trailer is parked in an adequate manner, as illustrated in FIG. 2a;

the container 4 is placed onto the supports 24 of the bay, as illustrated by FIG. 1b;

as the supports 25 of the trailer are fixed to a structure that rises, the supports are raised with the structure in order to reach the bottom of the container, then raised again in order to exceed the level of the supports 24 of the bay, the container then solely being borne by the supports 25 of the trailer;

once the supports 25 of the trailer have reached a given level, the trailer 1 may be withdrawn from the bay, laden with the container, the supports 25 bearing the container then passing above the supports 24 of the bay.

In order to unload the container, the steps are carried out in reverse order.

The preceding steps show that the trainer 1 must be placed in the loading bay 3 with precision, in particular with respect to the lateral walls 21, 22. The expected precision may be of the order of centimeters, or even less. A time constraint is to be added to this demand for precision, as the trailer must be quickly parked in the bay 3.

Figure 3:
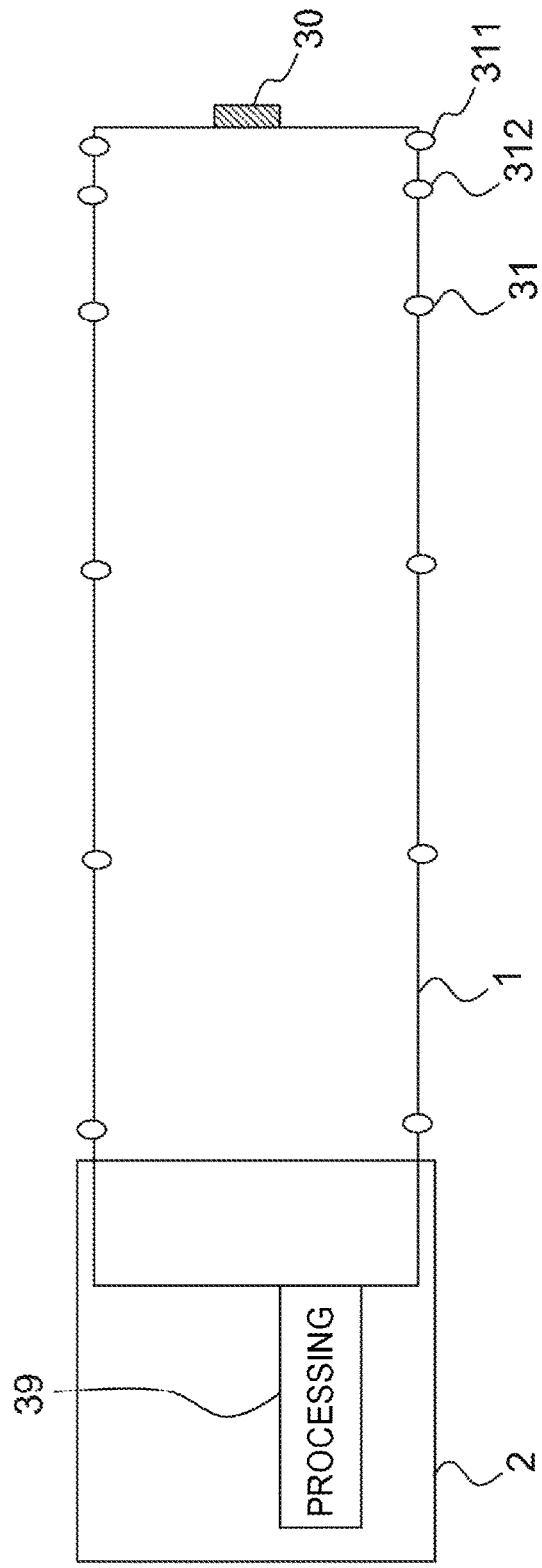
FIG. 3, in simplified form, a device according to the invention.

FIG. 3 illustrates, in a simplified manner, a parking assistance device according to the invention, the device being shown installed on a vehicle. The device comprises sensors 30, 31 and processing means 39. More particularly, FIG. 3 shows the trailer 1 equipped with sensors 30, 31, the processing means 39 being, for example, positioned in the cab 2. A particular function of the device according to the invention is to provide information on the relative positioning of the trailer with respect to a target parking space.

A lidar 30 is placed at the rear of the trailer, more particularly on the side facing the entrance of the parking space 3. The lidar scans a wide angle, e.g. greater than 180°. Ultrasound sensors 31 are positioned on the lateral sides of the trailer. As they are cylindrical in form and of small size, they may be inserted into the structure of the vehicle, the chassis of the trailer 1 in this example.

Advantageously, it is not necessary to position these sensors close to the ground, as their detection cones are sufficiently wide.

They may be positioned regularly along the lateral sides of the trailer 1, the spacing between sensors depending on the geometric features to be detected. Preferably, and advantageously, the ultrasound sensors 31 are positioned with increasing distances between sensors as illustrated by FIG. 3, the two first sensors 311, 312 starting from the rear of the trailer being the closest together. In the example of FIG. 3, six ultrasound sensors are placed on each side of the trailer.

The number of ultrasound sensors depends, in particular, on the obstacles to be encountered. In the present example in which the bay 3 comprises crenelations, enough sensors 31 are required in order to simultaneously measure the distances to the closest walls, corresponding to the crenelations, and the distances to the furthest walls.

The data provided by the lidar sensor 30 and the ultrasound sensors 31 are merged and processed by the processing means 39 in a manner that will be described below.

The lidar has a range of many tens of meters allowing, in a first instance, approach searches to be carried out in order to detect the entrance of the parking space, i.e. the entrance of the loading bay 3 in the exemplary application. The ultrasound sensors, with a range of many tens of centimeters, though less than a meter, allow precise measurements to be obtained.

Figure 4C:
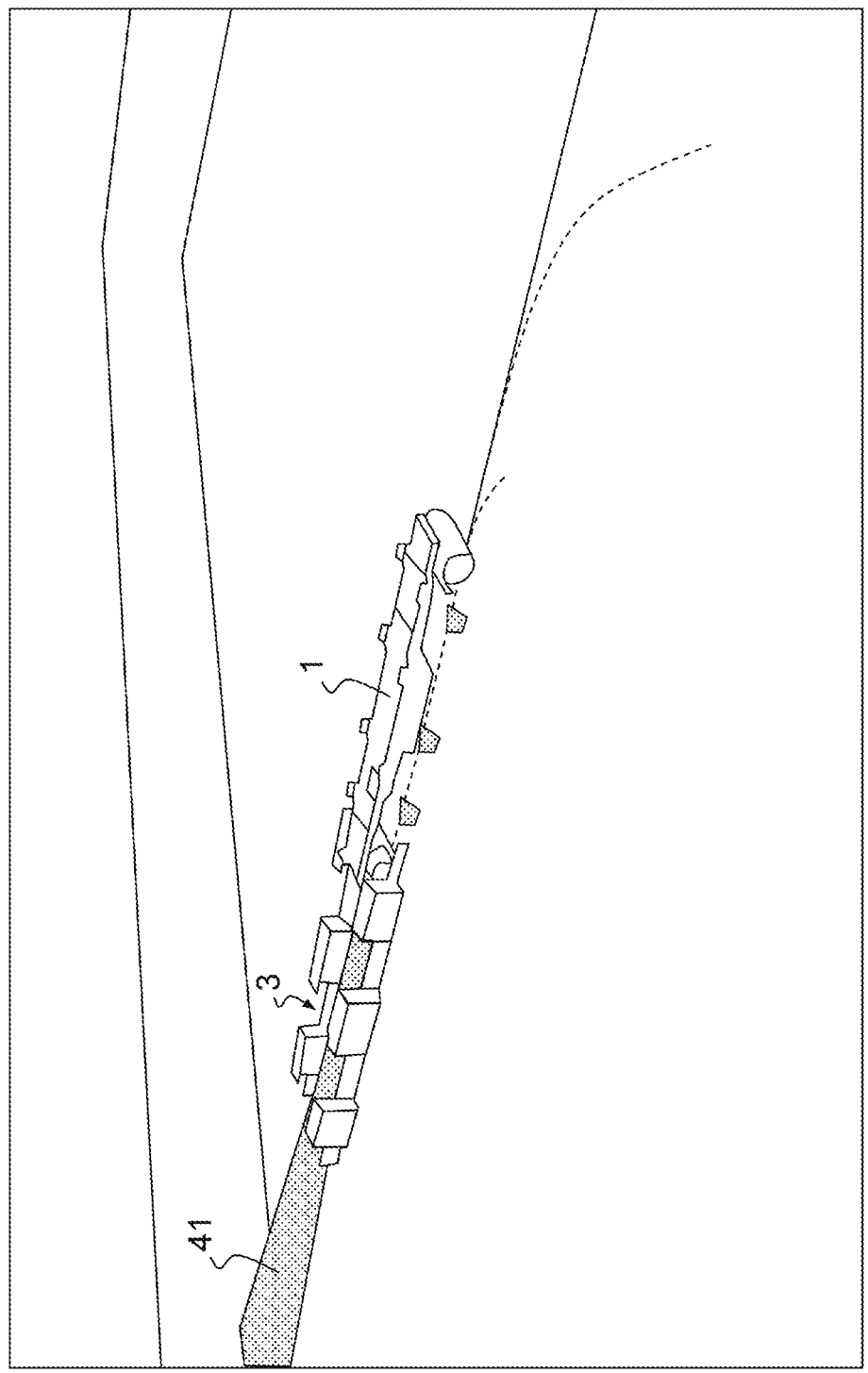
Figure 4D:
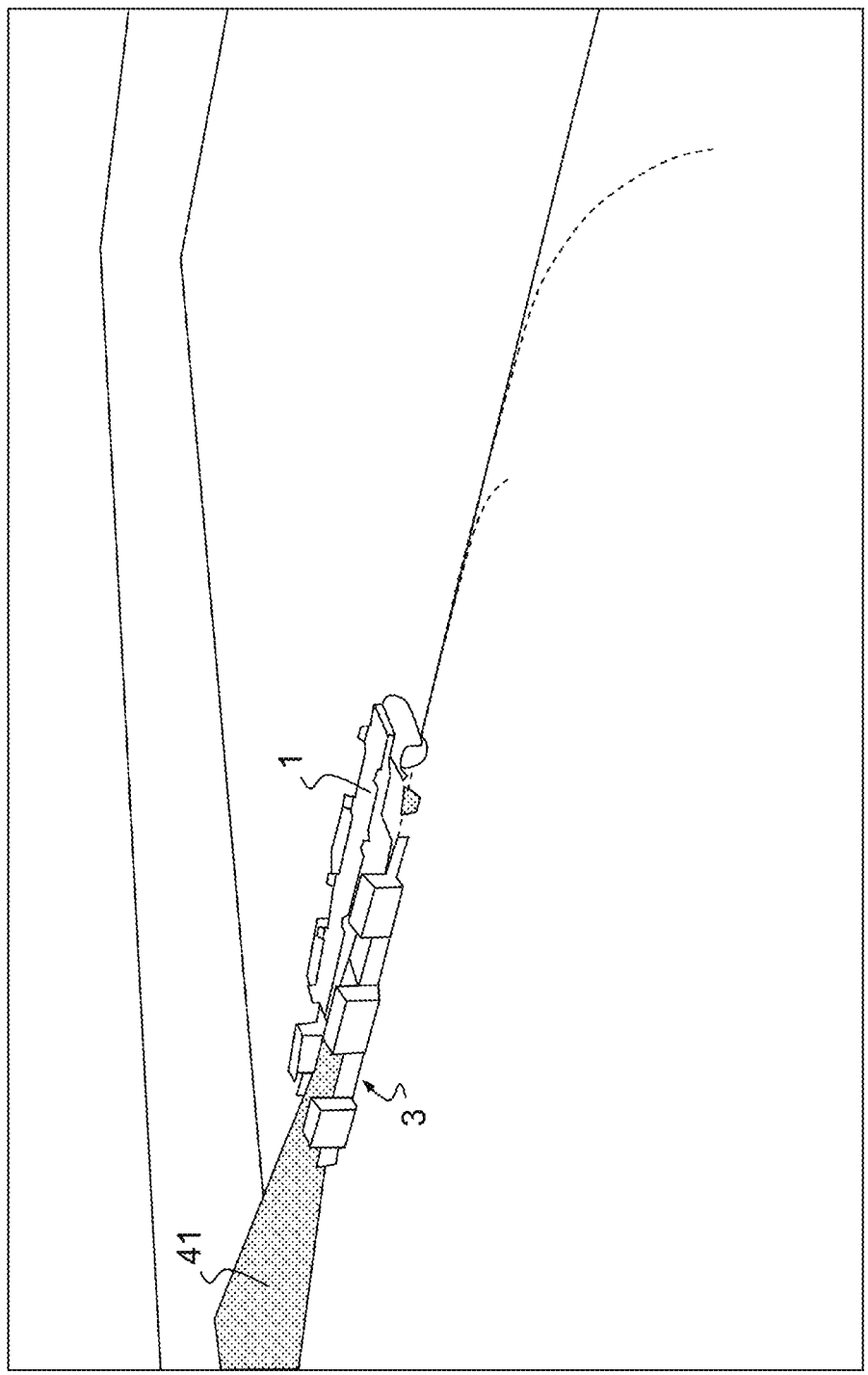
Figure 4E:
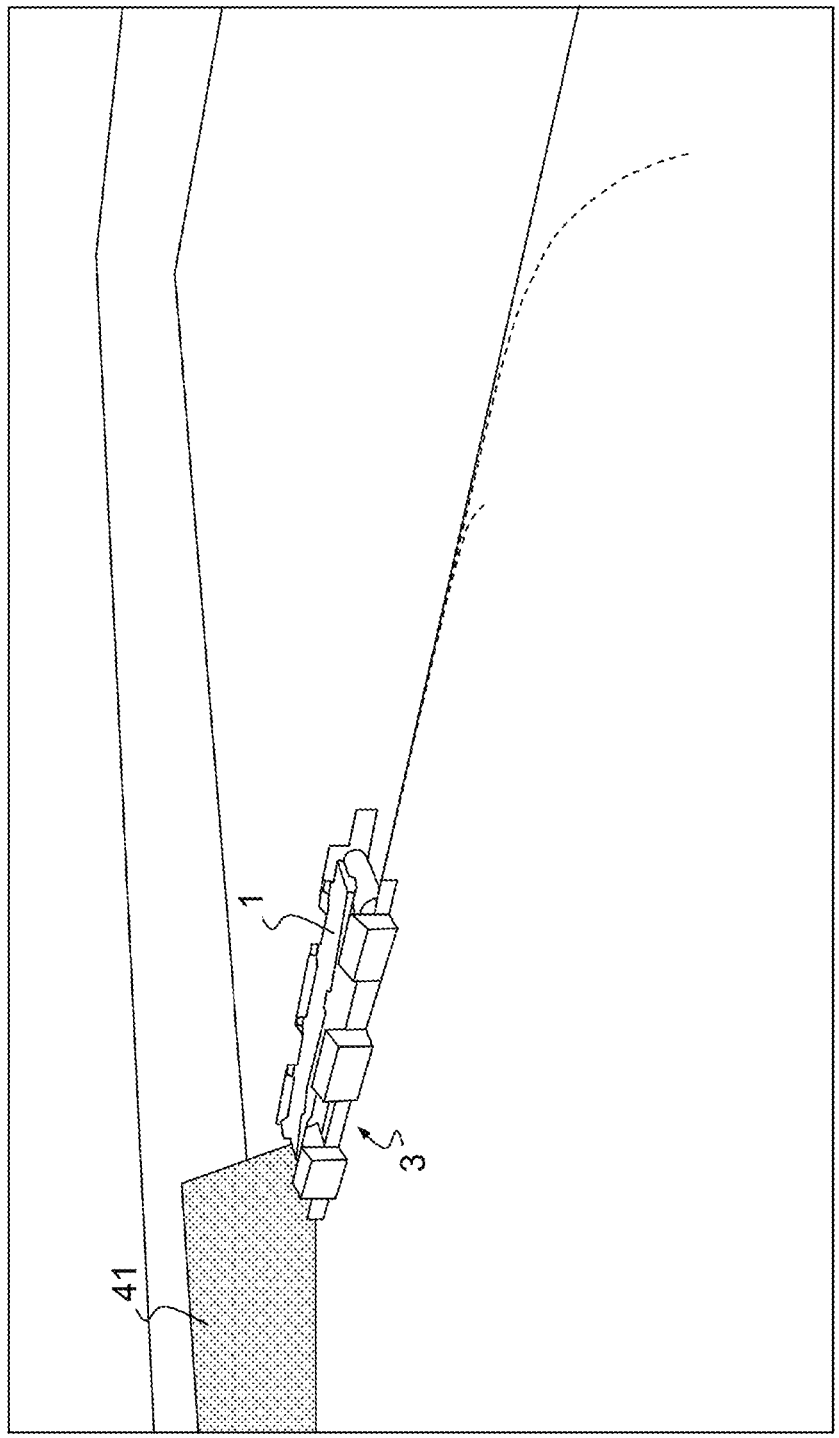

FIGS. 4a to 4e illustrate the parking phases carried out with the aid of a device according to the invention, these phases are illustrated for parking in a loading bay 3. The parking function carried out by this device comprises three successive phases:

a first phase illustrated by FIGS. 4a and 4b, referred to as the approach phase, in which the device makes the vehicle 1, 2 approach to within a few meters from the entrance of the parking space 3, from a starting point that may be many tens of meters away, the only constraint being that the entrance of the parking space is covered by the scanning 41 of the lidar, i.e. detectable by the latter; in practice the rear of the vehicle may approach to within one or two meters from the entrance in this approach phase as illustrated by FIG. 4b, the positioning being carried out with a precision of the order of a few centimeters, three centimeters for example;

a second phase illustrated by FIG. 4c, referred to as the entry phase, in which the device makes the rear of the vehicle 1, 2 insert itself into the parking space 3, within the unloading bay in the example of FIGS. 1a, 1b, 2a and 2b. The entry, insertion, is carried out over a short distance, a few tens of centimeters, fifty centimeters for example. In this entry phase, the precision of positioning is of the order of centimeters;

a third phase illustrated by FIGS. 4d and 4e, referred to as the advancing phase, in which the device makes the vehicle 1, 2 advance until it reaches its final parking position (FIG. 4e), i.e. its loading/unloading position in the present example. In this phase, the precision of positioning may be of the order of millimeters. This advancing phase will hereinafter be called the reversing phase, in reference to the exemplary application in which the vehicle reverses into the parking space. It is of course possible to envisage cases of applications in which the vehicle enters by driving forward.

The lidar sensor 30 therefore first ensures that the approach and entry phases are carried out. This sensor is capable of giving distance measurements:

on a horizontal plane, the position of the ground and the orientation of the moving vehicle being essential;

with respect to the lateral walls 21, 22 of the loading bay 3, in order to know the yaw of the vehicle and its lateral and longitudinal positioning.

The lidar 30 is also capable of giving information for detecting the edges of the structure of the bay that form geometric features, in particular the edges of the entrance borders of the lateral walls 21, 22 or the edges of the crenelations 23.

The lidar sends a substantial list of detected points, more than 1000 points in the example of FIGS. 4a to 4e, as polar coordinates on a horizontal plane scanned by the beam 41. The lidar is, for example, located in the center of the rear side of the trailer or vehicle, above the bumper. Advantageously, it is not necessary to position the lidar close to the ground.

Figure 5B:
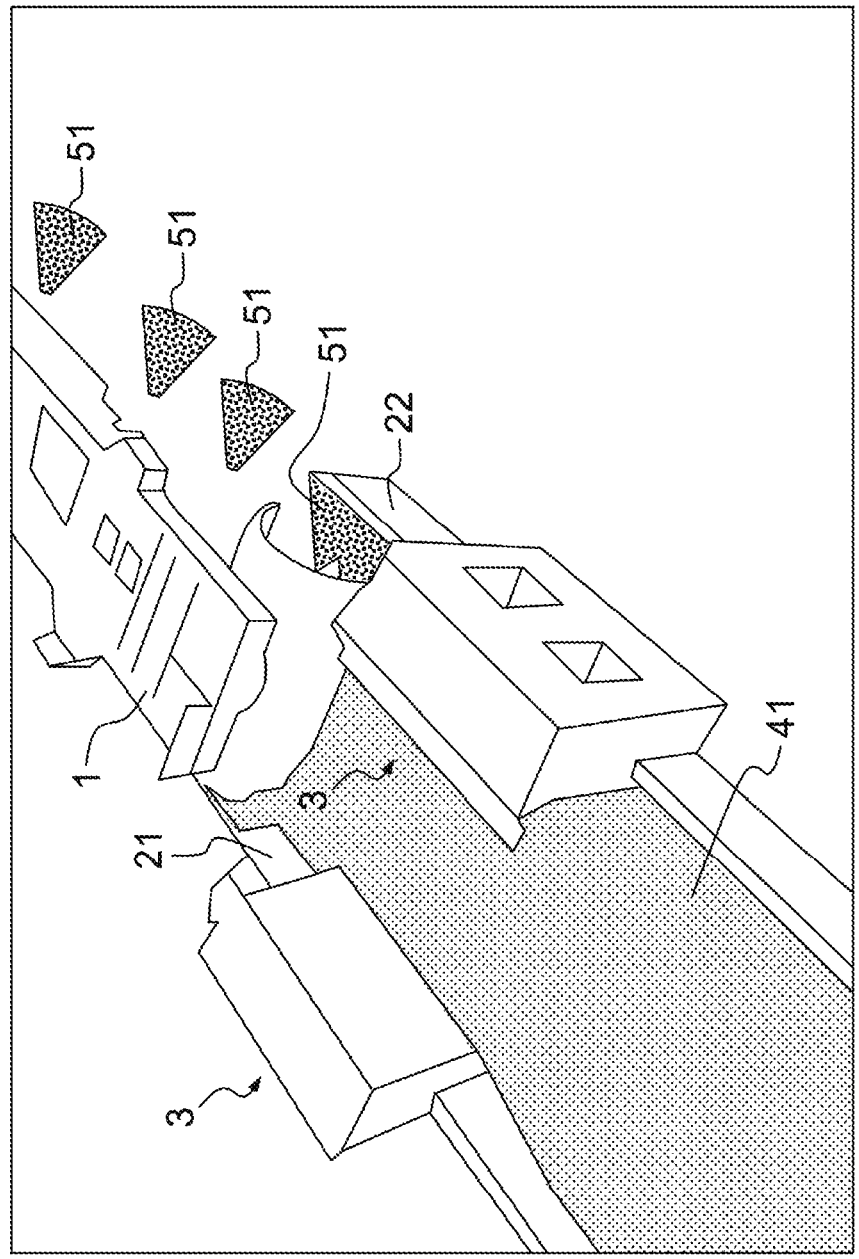
Figure 5C:
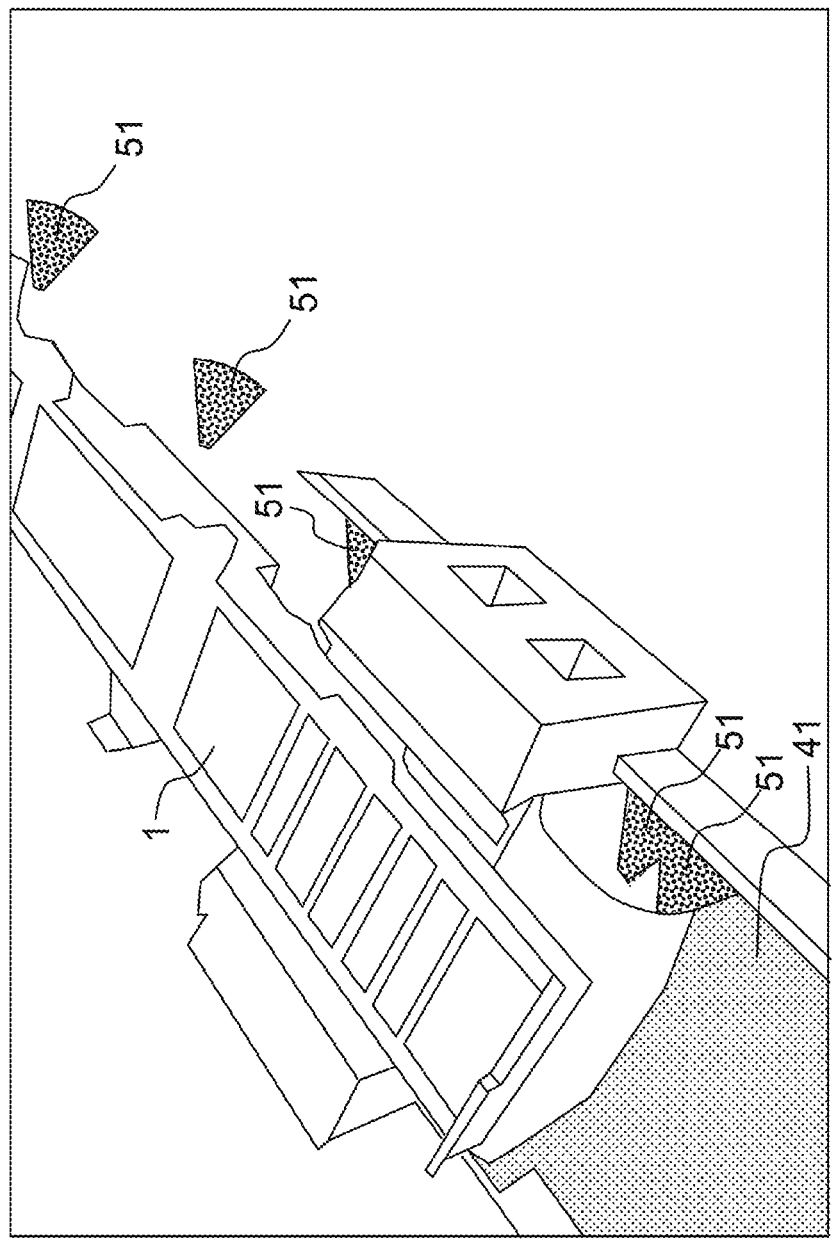

FIGS. 5a, 5b and 5c illustrate the three phases, approach, entry and reversing, by showing the detection cones 51 produced by the ultrasound sensors 31.

FIG. 5a illustrates the end of the approach phase in which only the beam 41 of the lidar scans the parking space 3, the rear of the trailer facing the entrance of the parking space, at a distance of about one meter.

FIG. 5b illustrates the end of the entry phase and the start of the reversing phase. In the reversing phase, the sensors 31 start producing measurements which are used as illustrated by the positioning of the two first detection cones 51 encountering the lateral walls 21, 22. Advantageously, the short distance between these two first sensors, according to FIG. 3, allows heading and lateral distance information to be very quickly obtained.

FIG. 5c illustrates the rest of the reversing phase in which the other sensors 31, identified by their detection cones 51, encounter the lateral walls, leading to the acquisition of a series of lateral distance measurements.

From a structural standpoint, the invention notably has the following advantages:

the invention does not require any active device in the bay 3 or around the bay, it is sufficient for the walls to be reflective to the waves emitted by the lidar sensor and the ultrasound sensors, most walls meeting this requirement; in particular, simple metal sheets may be used to line the walls;

the sensors may be located in protected areas of the vehicle, which is not the case with the antennas used in prior solutions;

reliability and robustness are ensured, in particular because, owing to their position on the vehicle, the sensors are less subject to impacts, soiling, damage or vibrations in particular, given that they are not placed close to the ground. Moreover, the ultrasound sensors are redundant by design.

In combination with this structure, a device according to the invention comprises processing means 39 for making use of all of the measurement data provided by the sensors, these data arriving in an asynchronous and wholly disordered manner.

Figure 6:
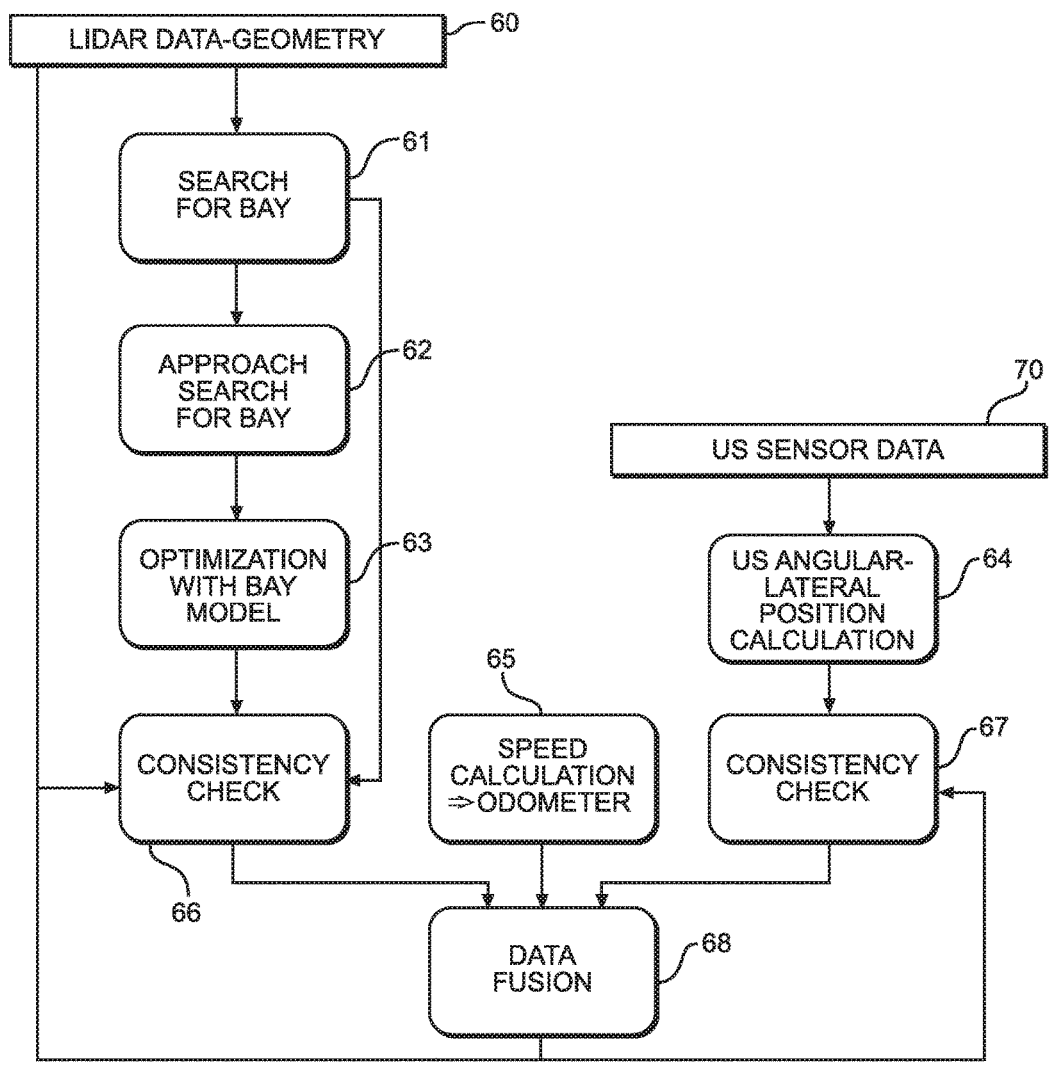
FIG. 6, the possible modules forming the processing means of a device according to the invention.

FIG. 6 shows the various possible processing modules forming the processing means 39 of a device according to the invention. The processing means presented by this FIG. 6 comprise four location modules 61, 62, 63, 64, three modules 61, 62, 63 using the measurements by the lidar sensor and one module 64 using the measurements by the ultrasound sensors 31. Another module 65 allows velocity vector measurements to be obtained, if necessary.

A first processing module 61 carries out the search for the parking space 3, corresponding to the approach phase of FIG. 4a. Subsequently, in reference to the exemplary application of the figures, the parking space may be called the bay. This module 61 uses both the measurement data provided by the lidar sensor and certain geometric features 60 of the bay 3. In this phase, the system aims to position the vehicle with respect to a generalized form of the bay, the general form of the walls including, in particular, the crenelations or posts.

The space of the received data is discretized. It is a two-dimensional space in which one datum, representing a laser echo, is defined by an angle and a distance. Clouds of points are obtained, where each point corresponds to one echo. The density of points of each cloud, or area, is examined using thresholds, each dense area being indexed. These dense areas are supposed to represent the posts 23 of the bay 3, they must therefore be separated by specific distances. These specific distances are additionally given by the geometric features of the bay used elsewhere. In a known manner, filtering based on the dimensions of the bay is applied, allowing potential detection errors to be eliminated. In this filtering, multiple hypotheses on the relative position of the bay with respect to the vehicle may arise. In the case of a parking space other than the loading bay 3 presented by way of example, the module would take other geometric features into consideration. The parking space must at least return echoes of geometric features corresponding to physical elements, allowing the lidar, and hence the rear of the trailer 1, to be positioned with respect to these physical elements. The module 61 is active on starting the parking phase.

At the end of the approach phase, a second processing module 62 carries out a more precise search for positioning. It still uses the data from the lidar sensor, as well as certain geometric features of the bay. However, instead of searching for generalized forms specific to the bay, it searches for simpler and more precise geometric forms.

In the clouds of points, the module thus searches, for example, for elements that are characteristic of the structure of the bay such as, for example, the corners formed by the posts. The spatial mapping of these cutoff points of the structure allows lateral and longitudinal relative positioning. For other types of parking spaces, other characteristic forms may of course be used.

The module 62 therefore aims, for example, to detect a series of corners along the length of the bay 3 by detecting the two visible orthogonal walls of the posts. The alignment of these corners allows the limit for the passage of the vehicle to be defined. The estimation of this alignment in the frame of reference of the sensor allows the vehicle to be positioned with respect to this limit.

Figure 7A:
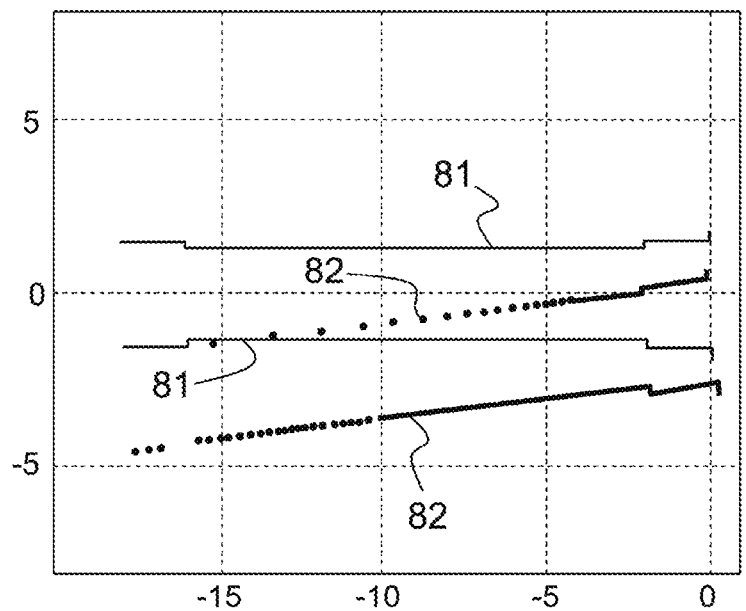
FIGS. 7a and 7b, an illustration of the operation of an algorithm for transformation between clouds of points, which may be used by a device according to the invention.
Figure 7B:
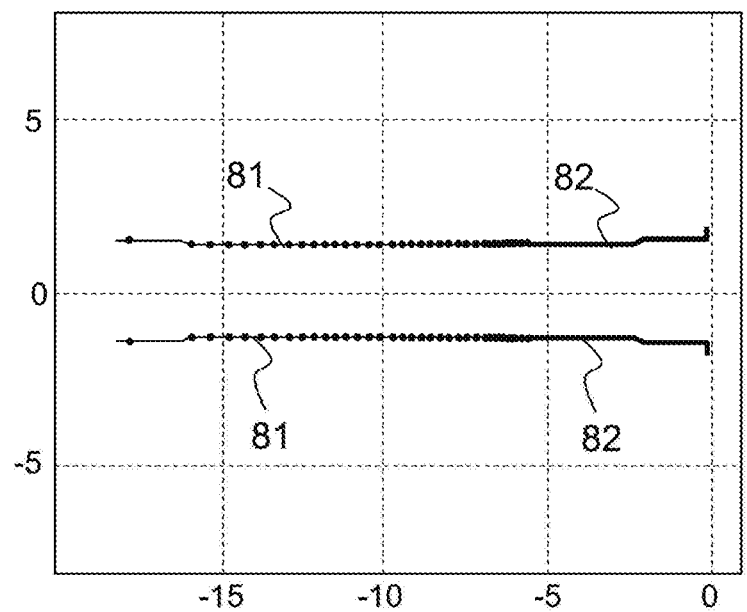

A third module 63 still uses the data provided by the lidar sensor, but instead of using characteristic geometric forms such as the corners described above, it uses the entire geometric model of the bay 3 in order to optimize, in particular, the position calculations. This module mainly comprises an algorithm for estimating the transformation between two clouds of points. This type of algorithm, being based on two clouds of points, calculates the movement to be applied to a cloud in order to superpose it over the other (best-fit-type algorithm). The data provided by the lidar already form a list of points defined by polar coordinates (angle, distance). Thus, in order to be able to use the above estimation algorithm, a discretization of the model of the bay 3 is carried out. From this discretization, a cloud of points as polar coordinates representing the theoretical bay is retrieved. The estimation algorithm, being based on the two lists of points, provides a transformation estimate describing the relative motion of the vehicle between the present instant and the last known instant. FIGS. 7a and 7b illustrate the operation of the algorithm for transformation between clouds of points. In FIG. 7a, the theoretical model of the bay 3 in relation to clouds of points 82, corresponding to the measurements made, is represented by two lines 81. From these two curves, the movement to be applied to the lidar 30, i.e. to the rear of the vehicle, in order to superpose the two lines as shown in FIG. 7b is calculated.

A processing module 64 uses the measurement data from the ultrasound sensors 31, these measurements being used for precisely guiding the vehicle into the bay 3. The module 64 is activated, in particular, in the phases illustrated by FIGS. 4c, 4d, 4e, 5b and 5c.

The ultrasound sensors 31 are very precise over short distances and have a cone-shaped detection beam 51. They cannot be used for detecting the longitudinal position of the vehicle, the nature of their measurements allowing information only on the angle between the vehicle and the longitudinal limits of the bay, i.e. the longitudinal walls in the case of the loading bay 3, to be provided. The measurements by the ultrasound sensors also allow information on the lateral position of the vehicle in the bay to be provided, i.e. actually on its centering in the bay.

The measurements by the ultrasound sensors may be represented as arcs of circles in the local frame of reference of the vehicle whose centers are those of the sensors, the radii being the measured distances and the open angular sector corresponding to the aperture of the measurement cones 51. In the case of the loading bay 3, it is however noted that the walls 21, 22 are not planes but form crenelations. The measurements may just as well encounter the wall furthest from the vehicle as encounter the wall closest to the vehicle.

One solution is to memorize the maximum and minimum widths measured while docking, i.e. when entering the bay at the start of the entry phase, and to associate each measurement either with a far plane measurement or a near plane measurement. This distinction having been made, the module 64 best calculates the four planes, drafted on the basis of the measurements. A very precise estimate of the angle between the local frame of reference of the vehicle and the central axis of the bay 3 is then obtained by averaging. The planes of the walls now being known, the module 64 may calculate the position of the central axis y of the vehicle 1 in the frame of reference of the bay 3.

The processing means use, for example, a processing module 65 employing speed information provided, for example, by an odometer. In this case, the device according comprises at least one odometer, placed on a wheel of the vehicle 1. The odometric sensors detect the rotational speed of the wheels. Using this rotational speed information, it is possible to estimate the movement speed of the vehicle, knowing the diameter of the wheels. If two wheels of one and the same axle are equipped with this type of device, it is also possible to determine the direction of movement.

Two modules 66, 67 check the consistency of the positions calculated by the location modules described above. More particularly, a first module 66 checks whether the calculations carried out on the basis of the measurements by the lidar sensor 30 are consistent, in particular in time and space, and a second module 67 checks whether the calculations carried out on the basis of the measurements by the ultrasound sensors 31 are also consistent in time and space.

Consistency is evaluated individually and collectively in time and absolutely with respect to the measurements by the sensors. In practice, the modules 66, 67 check that two calculated positions at two successive instants do not result in a movement that is inconsistent with the capabilities of the vehicle and the movement required thereof. They also check that each measurement made by a sensor has indeed been able to occur in the case in which the vehicle is located at the calculated position taking into account the form of the bay 3. To this end, each module positions the vehicle in the model of the bay on the basis of the position measurements made, the model of the bay being modeled in the module, or at least accessible by the latter. The module analyzes whether the position is consistent according to the preceding position.

The consistency check makes particular use of the comparison between successive positions in the model, as a function of the measurements provided by the various sensors. This check is carried out in cycles according to the sampling periods of the various types of sensors.

The period T1 of sampling the data provided by the lidar sensor 30 is, for example, equal to 40 ms, compatible with the expected precision of the lidar measurements. The period T1 is then the period of the consistency check cycle with respect to the lidar measurements. The check may be carried out between two successive samplings, using the data from the last sampling.

The period T2 of sampling the data provided by the ultrasound sensors is, for example, equal to 20 ms, compatible with the expected precision of the ultrasound measurements. Likewise, the period T2 is the period of the consistency check cycle with respect to the ultrasound measurements.

Lastly, in the case in which the device according to the invention uses an odometer, the period T3 of sampling the speed measurements is, for example, equal to 10 ms.

The module 65 using the odometric measurements may carry out the checks itself or transmit its speed vector data to the two consistency check modules 66, 67 so that each one carries out consistency checks, combining the odometric measurements and the lidar measurements for one 66 of them, and the odometric measurements and the lidar measurements for the other 67. In any case, the check times must be shorter than the associated periods T1, T2, T3.

In the event of inconsistency, multiple decisions may be taken, in particular among the following:
stop the device and the vehicle;
transmit a warning;
recalculate the positions.

The modules 66, 67 transmit the inconsistency information to a control member (not shown) which takes the decision. In the event of stopping, the inconsistency information is sent to the monitoring and control circuit of the vehicle.

In the event of a warning, the information may be transmitted to acoustic or visual interface means intended for a user, in particular the driver of the vehicle if it is not automatically driven.

The processing means 39 additionally comprise a data fusion module 68. This module carries out, for example, spatio-temporal filtering on the calculations of the relative position and orientation of the vehicle with respect to the walls of the bay that are produced by the various modules, e.g. of Kalman filter type. The spatio-temporal filtering may also be carried out by a particle filter (sequential Monte Carlo method).

The spatio-temporal filtering allows all of the information calculated by the modules described above to be made consistent in order to provide relative position information that is stabilized, i.e. complete and containing little noise. By virtue of this spatio-temporal filtering, this module 68 is capable of merging asynchronous data, provided by various sensors, and hence providing elements of various natures. In particular, the lidar provides data in terms of x (along the longitudinal axis of the bay), in terms of y (along the transverse axis of the bay) and in terms of angle θ° for heading measurements. The ultrasound sensors provide a datum in terms of y, along the transverse axis, and in terms of angle θ° for the heading. An odometer provides information on distance and, potentially, on direction.

This module 68 is also capable of managing data not arriving in the right chronological order, arriving in a dispersed order, without mutual consistency, a lidar measurement sampled before an ultrasound measurement potentially arriving after the latter.

This module 68 takes into account the relative precision of the calculations carried out by each module described above.

The device according to the invention delivers, as output, information on the relative position of the vehicle with respect to the limits of the parking space. This information is transmitted to the monitoring and control system of the vehicle, known from elsewhere. Based on this relative position information, the monitoring and control system activates the vehicle's driving system, which is to a greater or lesser degree automatic depending on the presence or absence of a driver. The position information is, for example, transmitted periodically according to the consistency check cycles described above, e.g. every 10 ms. The spatio-temporal filtering calculations 68 must then be carried out in this period.

The position of the sensors on the vehicle has been described above. The lidar sensor is placed on the side of the vehicle facing the entrance of the parking space and the ultrasound sensors are placed on the lateral sides of the vehicle. It is possible to place a lidar sensor at the rear and at the front of the vehicle, in particular in the case of an automatically driven automotive platform that is liable to enter a parking space by driving forward or reversing.

The processing means 39 may be located on the trailer 1 or in the cab 2. In one preferred embodiment, the sensors 30, 31 directly deliver digitized data. These are then delivered to the processing means via a bus, through a wired connection for example.

The invention has been described for a vehicle composed of a cab 2 and a trailer 1, the trailer having to be parked in a bay for loading/unloading containers. The invention is of course applicable to other types of vehicles. It is particularly advantageously applicable to long vehicles, buses for example, or to oversized vehicles, all of these vehicles having to be parked with precision. The invention has also been presented with the use of a lidar sensor. Another sensor may be used, provided that it has the same range and precision characteristics. It is thus possible to use one or more video sensors. A radar sensor may also be used. It is furthermore possible to combine one or more types of sensors 30. A lidar sensor and a video sensor may, for example, be combined at the rear of the vehicle.

The same applies for the ultrasound sensors, which may be replaced by sensors having analogous characteristics. In particular, it is possible to use optical telemetry sensors.

The invention is applicable to vehicles with drivers or to automatically driven vehicles. In the case of a vehicle with a driver, the latter controls the speed, in particular.

The invention has been described for parking in a bay for loading and unloading containers. It is of course applicable to numerous other types of parking space, provided that they are equipped with at least one lateral wall having longitudinally distributed geometric features. In the example of the bay 3, these geometric features are provided by the crenelations 23.

The invention may also advantageously be applied to parking spaces in which the walls are not fixed. This is particularly the case for the application of parking assistance to a bus parking between two other buses. The walls of the parking space are then the lateral surfaces of the two other buses, the geometric features potentially being deduced, for example, from the doors distributed along these lateral surfaces.

The invention claimed is:

1. A device for assisting with parking of a vehicle within a parking space provided with at least one lateral wall having longitudinally distributed geometric features, said device being capable of equipping a vehicle, the device comprising at least:
   - a rear sensor placed on a rear side of said vehicle facing the entrance of said space, the measuring beam of said sensor scanning said space, said rear sensor making measurements of a distance and orientation of said vehicle with respect to said parking space based on a reconstruction of a cloud of points belonging to a surface of said at least one wall;
   - a series of lateral sensors placed on at least one lateral side of said vehicle configured to measure the distance from said at least one lateral side to said at least one lateral wall, the measuring beams of said lateral sensors scanning said inner walls;
   - a processor configured to calculate the position and the relative orientation of said vehicle with respect to said at least one lateral wall in at least three separate phases:
     - an approach phase, wherein said at least one lateral wall is scanned by the measuring beam of said rear sensor to detect an entrance of the parking space, and the relative position and orientation are calculated with respect to the position and orientation of a general form of said at least one lateral wall deduced from said cloud;
     - an entry phase of inserting the rear of the vehicle into the parking space, wherein the position and the relative orientation are at least calculated with respect to the position and orientation of simple geometric forms deduced from said cloud, as a function of said geometric features; and
     - an advancing phase of advancing the vehicle to a final parking position, wherein the processor calculates a relative position and orientation by comparing said cloud with a memorized model of said at least one lateral wall and calculating another position and another relative orientation based on the distance measurements made by the lateral sensors, wherein said processor comprises a data fusion module that carries out spatio-temporal filtering of the relative position and orientation calculations produced from the rear and lateral sensors, the calculations thus filtered giving information on the position and orientation of said vehicle in order to control its movement.

2. The device as claimed in claim 1, wherein said rear sensor is a lidar sensor.

3. The device as claimed in claim 1, wherein said rear sensor is formed from at least one video sensor.

4. The device as claimed in claim 1, wherein said rear sensor is a radar sensor.

5. The device as claimed in claim 1, wherein the lateral sensors are ultrasound sensors.

6. The device as claimed in claim 1, wherein the lateral sensors are optical telemetry sensors.

7. The device as claimed in claim 1, wherein the spatio-temporal filtering is carried out using a Kalman filter.

8. The device as claimed in claim 1, wherein the spatio-temporal filtering is carried out using a Monte Carlo method.

9. The device as claimed in claim 1, wherein the processor calculates a relative position and orientation from the distance measurements made by the lateral sensors during the entry phase.

10. The device as claimed in claim 1, wherein the processor calculates a relative position and orientation by comparing said cloud with the memorized model by an algorithm for estimating the transformation between clouds of points.

11. The device as claimed in claim 1, wherein the measurements obtained by said rear sensor are sampled in a first period and the measurements obtained from the lateral sensors are sampled in a second period.

12. The device as claimed in claim 1, wherein the lateral sensors are positioned with increasing spacing between two consecutive lateral sensors, starting from the rear side.

13. The device as claimed in claim 1, wherein the processor carries out consistency checks in time and space between the successive calculations of relative position and orientation obtained from measurements by said rear sensor and between the successive calculations of relative position and orientation obtained from measurements by the lateral sensors, the consistent calculations being delivered to said data fusion module.

14. The device as claimed in claim 1, further comprising at least one odometer, placed on a wheel of the vehicle, the processor carrying out the estimation of the movement speed vector of said vehicle based on wheel speed measurements produced by the odometer, said estimation producing an estimate of the position and orientation of said vehicle that is taken into account by the data fusion module so as to define the position and relative orientation of said vehicle in order to control its movement.

15. A vehicle comprising a monitoring and control system for assisting with driving, wherein the vehicle is equipped with a device as claimed in claim 1, said system providing information on the positions and orientation of said vehicle to said monitoring and control system.

16. The vehicle as claimed in claim 15, wherein the vehicle is automatically driven.

17. The vehicle as claimed in claim 15, wherein the vehicle is composed of a cab and a trailer, said rear and lateral sensors being placed on said trailer.

\* \* \* \* \*